United States Patent

Liou

[11] Patent Number: 5,367,815
[45] Date of Patent: Nov. 29, 1994

[54] ROD REST SUPPORTING DEVICE

[76] Inventor: Shing-Fu Liou, No. 19, Lane 30, Min-Hsiang St., Chung Ho City, Taipei, Taiwan, Prov. of China

[21] Appl. No.: 159,532

[22] Filed: Dec. 1, 1993

[51] Int. Cl.⁵ .............................................. A01K 97/10
[52] U.S. Cl. .................................... 43/21.2; 248/514; 248/528; 248/538
[58] Field of Search ................. 43/21.2; 248/514, 528, 248/538

[56] References Cited

U.S. PATENT DOCUMENTS

| | | | |
|---|---|---|---|
| 2,693,660 | 11/1954 | Nebergall | 43/21.2 |
| 2,851,234 | 9/1958 | Scherfele | 248/538 |
| 3,636,649 | 1/1972 | Paiva | 43/21.2 |
| 3,906,653 | 9/1975 | Williams | 43/21.2 |
| 4,827,654 | 5/1989 | Roberts | 43/21.2 |
| 4,852,290 | 8/1989 | Wallace | 43/21.2 |
| 5,054,737 | 10/1991 | DeLancey | 43/21.2 |

Primary Examiner—Kurt Rowan
Attorney, Agent, or Firm—Morton J. Rosenberg; David I. Klein

[57] ABSTRACT

A rod rest supporting device includes an tripod having a tripod socket, a rotary member mounted in the tripod socket and locked by a lock screw, a cradle fastened to the rotary member by a fastening screw to hold a rod rest, on which a fishing rod rests, wherein the rotary member can be turned on the socket of horizontally when the lock screw is loosened; the cradle can be turned on the rotary member vertically when the fastening screw is loosened.

6 Claims, 9 Drawing Sheets

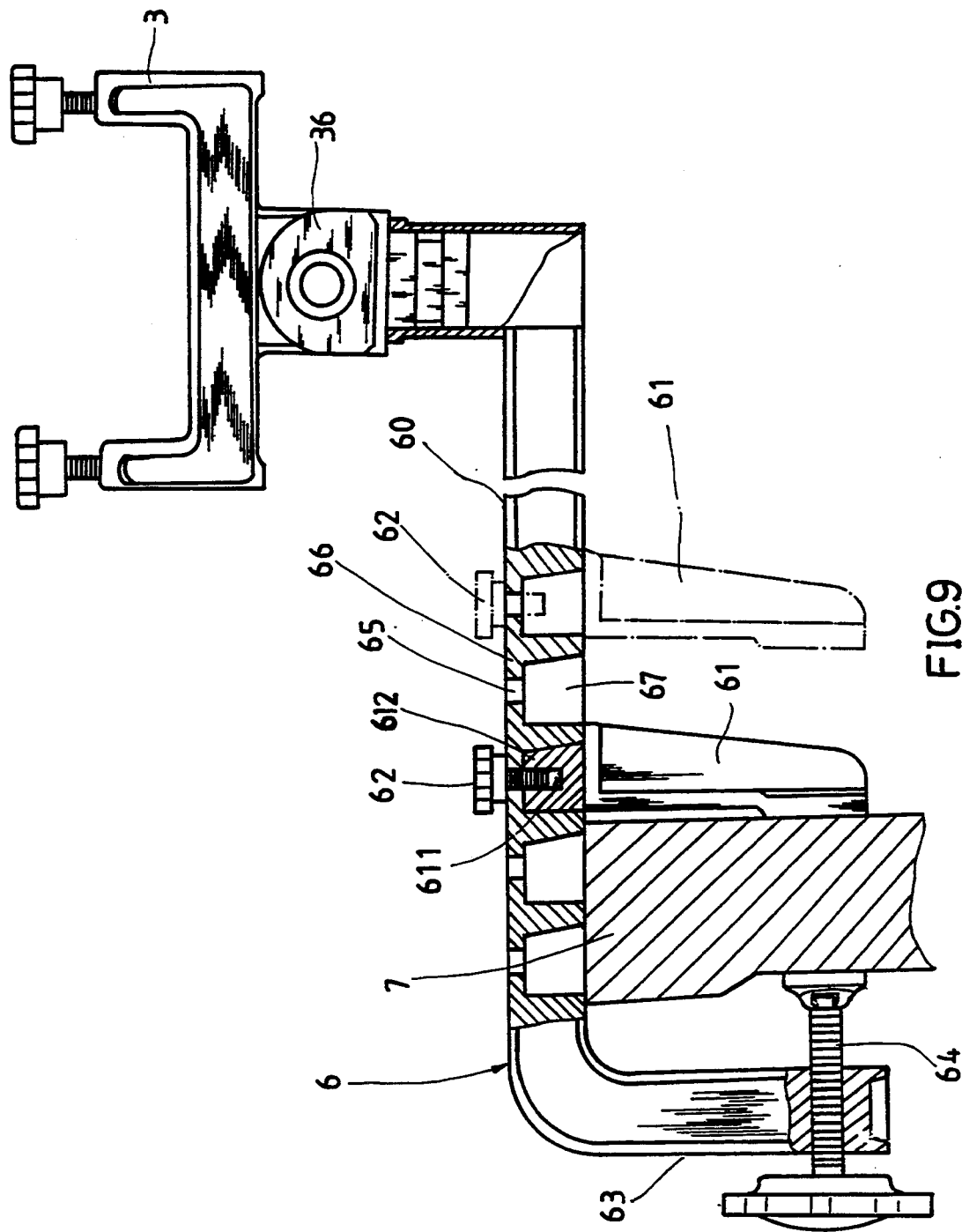

ROD REST SUPPORTING DEVICE

BACKGROUND OF THE INVENTION

The present invention relates to a rod rest supporting device for supporting a rod rest to hold a fishing rod which allows the rod rest and the fishing rod to be turned thereon horizontally as well as vertically.

During fishing, one will be tired from long holding of the fishing rod. Therefore, a rod rest is commonly used to support the fishing rod. FIG. 1 shows a rod rest for this purpose. This structure of rod rest is comprises of a pole having a forked tip on a the front end thereof and a vertical rack near the pointed rear end thereof. This structure of rod rest is not satisfactory in use. When installed, it cannot be adjusted to change the angle of inclination or the direction of the fishing rod. If to change the angle of inclination or the direction of the fishing rod, the rod rest must be removed from the ground and then fastened to the ground again according to the desired angle of inclination or direction.

SUMMARY OF THE INVENTION

The present invention has been accomplished under the aforesaid circumstances. It is therefore the principal object of the present invention to provide a rod rest supporting device which permits the fishing rod which rests on the rod rest to be conveniently adjusted to change its angle of inclination and direction. It is another object of the present invention to provide a rod rest supporting device which can be stably placed on the ground to support a rod rest for allowing the rod rest to be adjusted horizontally as well as vertically. It is still another object of the present invention to provide a rod rest supporting device which can be directly fastened to the ground to support a rod rest for allowing the rod rest to be adjusted horizontally as well as vertically. It is still another object of the present invention to provide a rod rest supporting device which can be fastened to the side of a boat to support a rod rest for allowing the rod rest to be adjusted horizontally as well as vertically.

According to one aspect of the present invention, the rod rest supporting device comprises an tripod having a tripod socket, a rotary member mounted in the tripod socket and locked by a lock screw, a cradle fastened to the rotary member by a fastening screw to hold a rod rest, on which a fishing rod rests, wherein the rotary member can be turned on the socket of horizontally when the lock screw is loosened; the cradle can be turned on the rotary member vertically when the fastening screw is loosened.

According to another aspect of the present invention, an anchoring fork may be installed to replace the tripod and directly fastened to the ground to hold the rotary member.

According to still another aspect of the present invention, a mounting assembly having a tension clamp may be used to replace the tripod and to support the rotary member on the side of a boat. The mounting assembly has a socket to hold the rotary member by a lock screw, and therefore the rotary member can be turned horizontally when the lock screw is loosened.

BRIEF DESCRIPTION OF THE DRAWINGS

FIG. 9 is a sectional plain view of FIG. 8.

DETAILED DESCRIPTION OF THE PREFERRED EMBODIMENT

Figure 1:
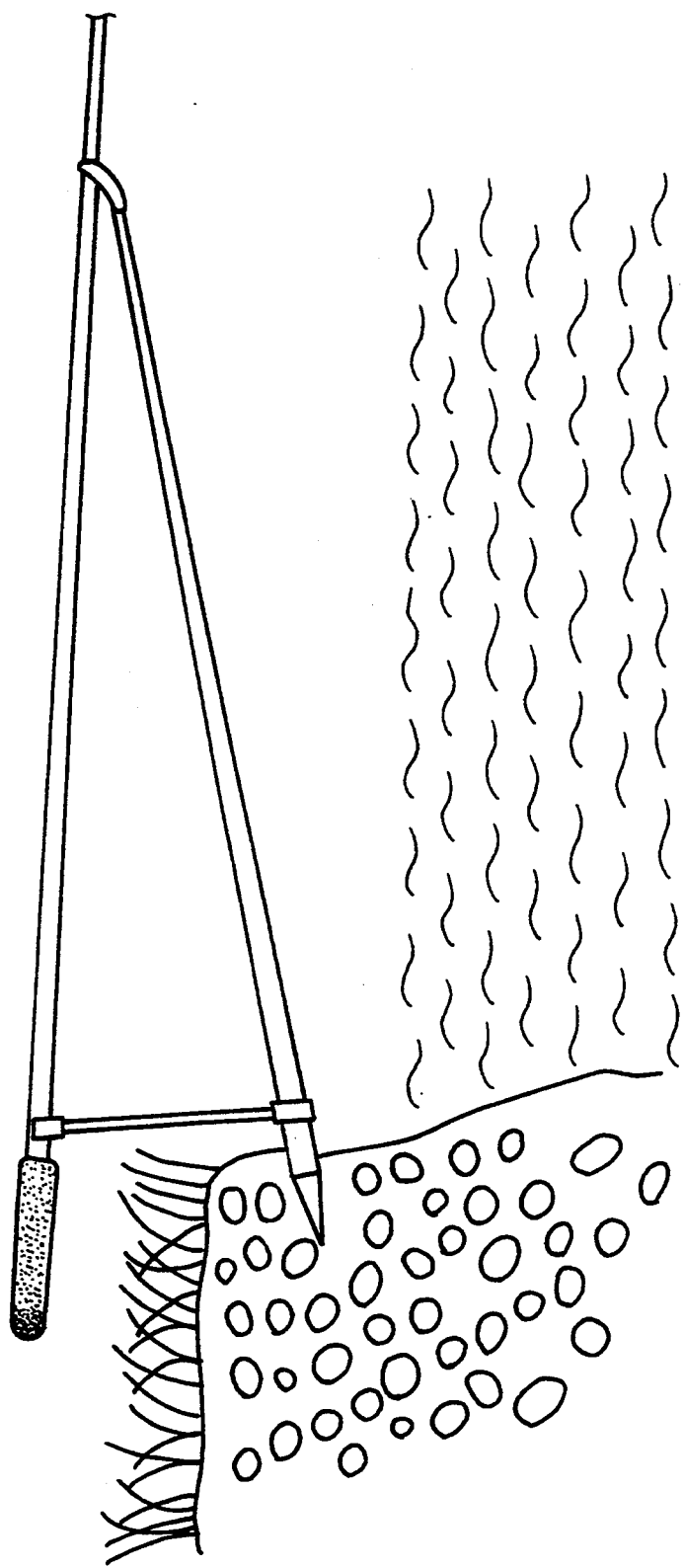
FIG. 1 shows a fishing rod rested on a rod rest according to the prior art.
Figure 2:
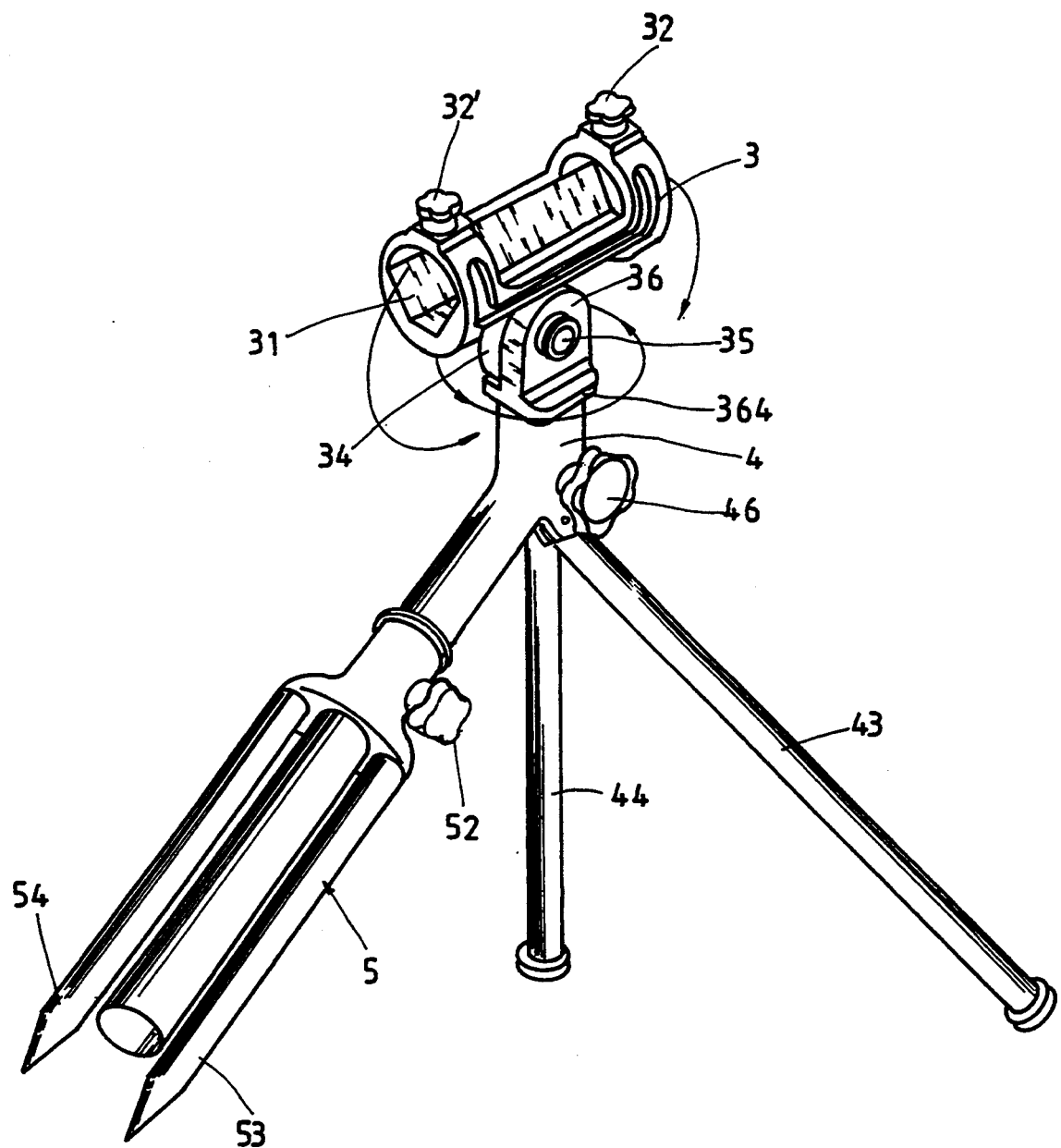
FIG. 2 is an elevational view of a rod rest supporting device according to the preferred embodiment of the present invention.
Figure 3:
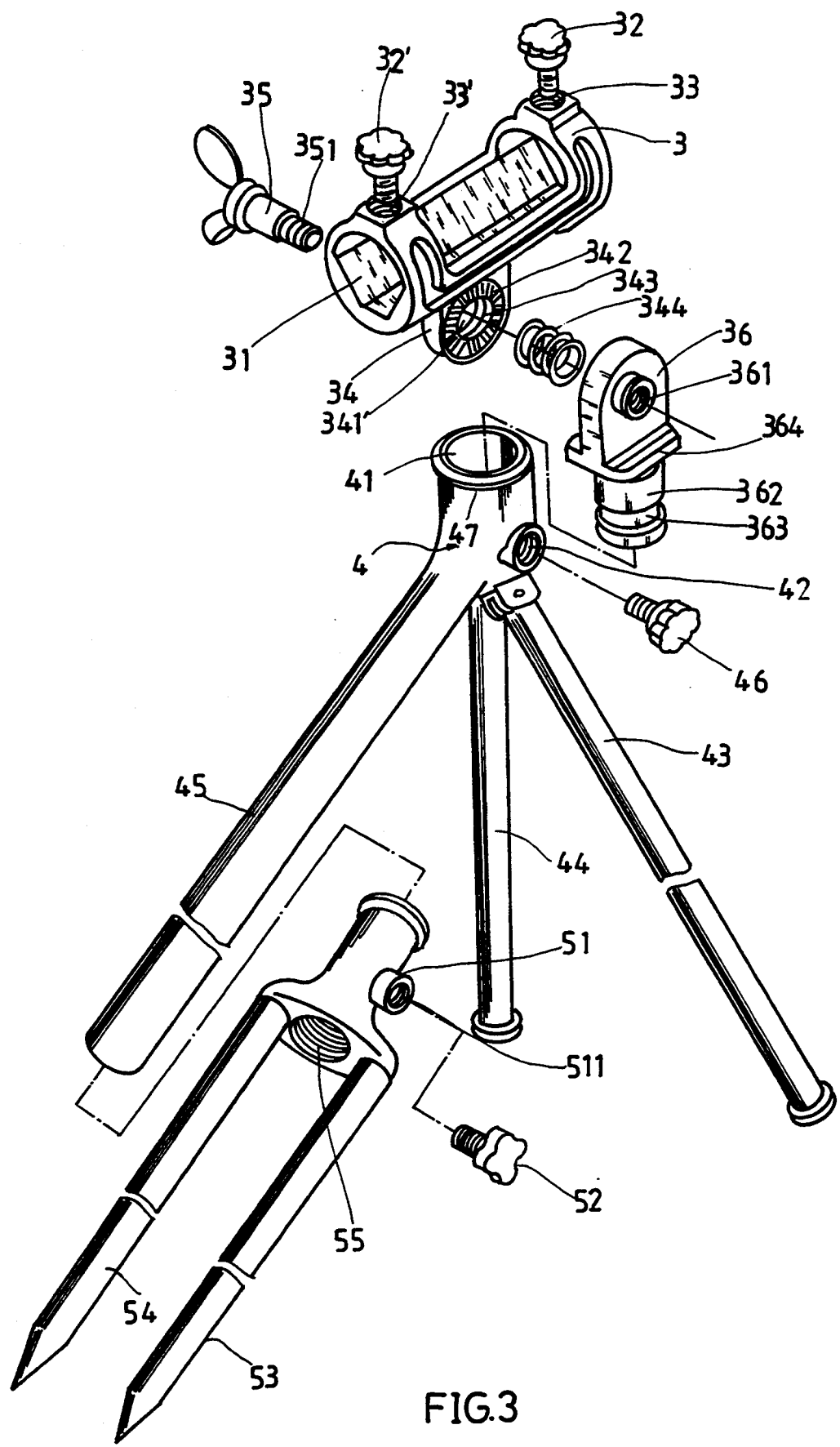
FIG. 3 is an exploded view of the rod rest supporting device shown in FIG. 2.
Figure 4:
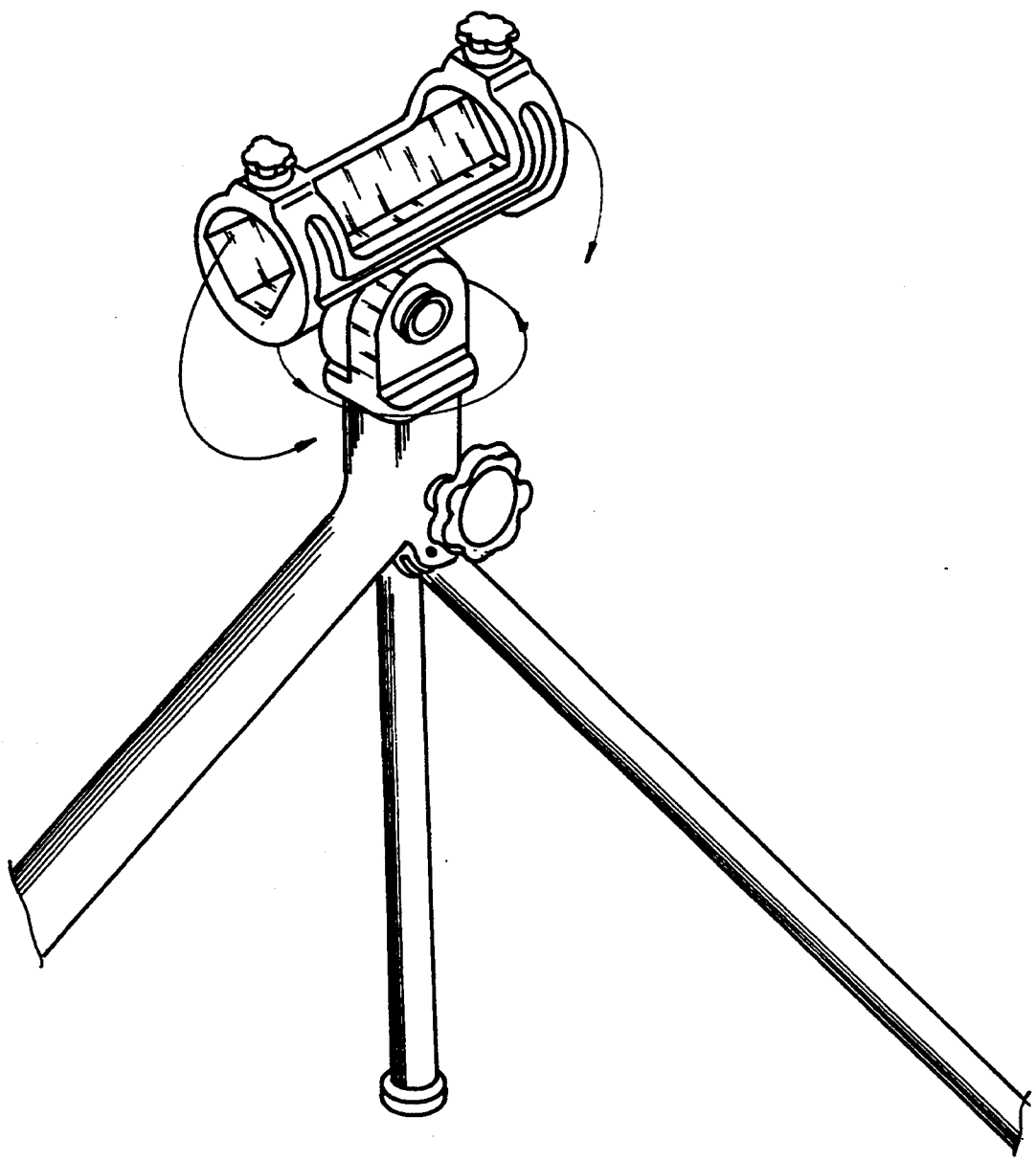
FIG. 4 shows the rotary member turned on the tripod socket of the tripod of the rod rest supporting device of FIG. 2 horizontally and the cradle turned on the rotary member vertically.
Figure 5:
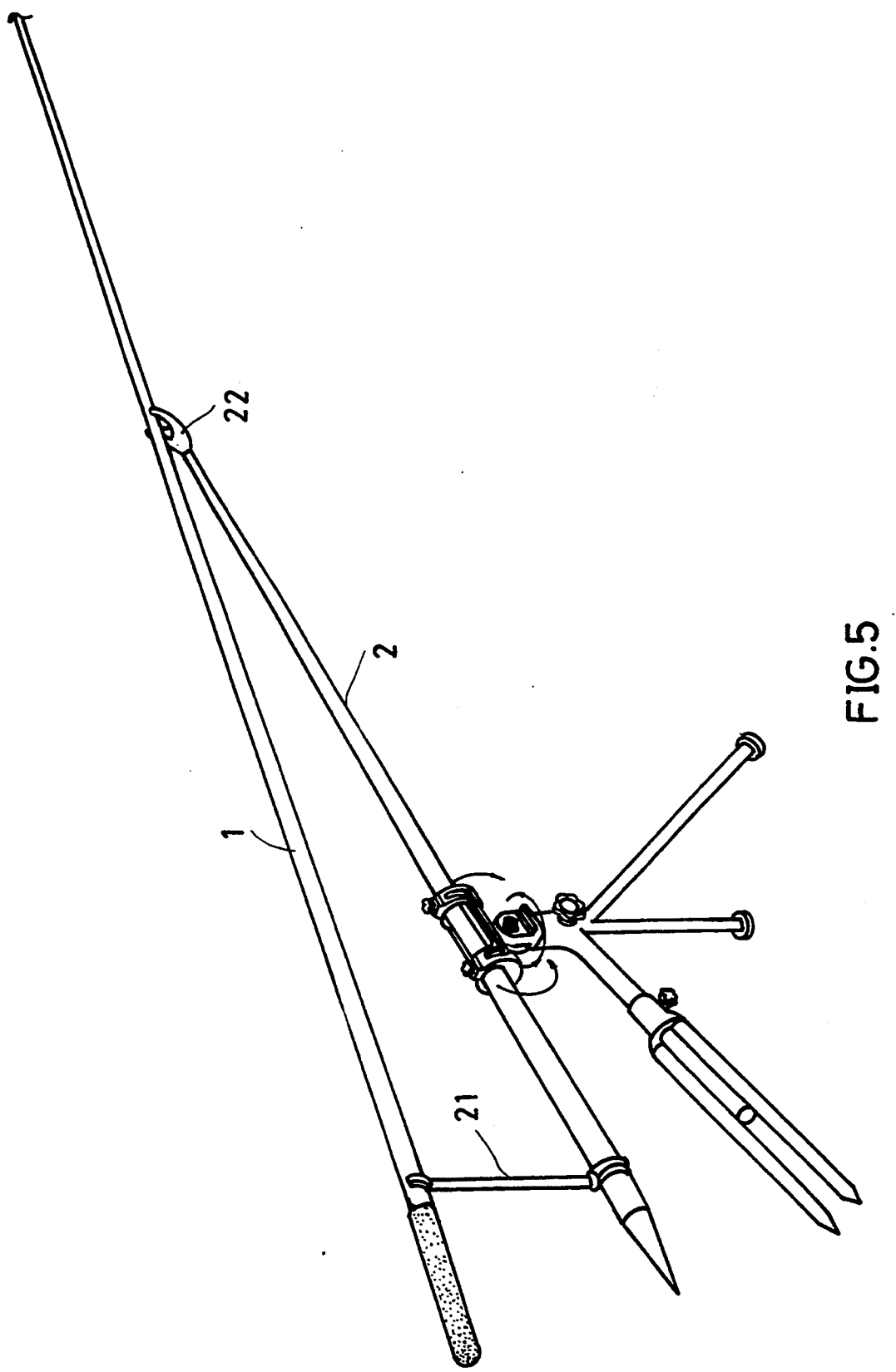
FIG. 5 shows the rod rest supporting device installed to hold a rod rest and a fishing rod.

Referring to FIGS. 2, 3, 4, and 5, the cradle, referenced by 3, is made of cylindrical shape comprising a longitudinal through hole 31, which receives a rod rest 2 having a forked tip 22 on a front end thereof and a vertical rack 21 near a rear end thereof to hold a fishing rod 1, two tightening up screws 32;32' respectively threaded into two screw holes 33;33' thereof spaced at the top to hold down the rod rest 2 in the longitudinal through hole 31, a mounting block 34 at the bottom fastened to a rotary member 36 by a fastening screw 35. The mounting block 34 comprises a circular recess 343, which receives a compression spring 344, a horizontal through hole 341 through the center of the circular recess 343, radial teeth 342 on one side thereof around the circular recess 343. The rotary member 36 comprises an outward flange 364 horizontally disposed in the middle, a horizontal screw hole 361 above the outward flange 364, radial teeth 365 (not shown) on one side thereof around the horizontal screw hole 361, a bottom rod 362, and an annular groove 363 around the bottom rod 362. The fastening screw 35 comprises a screw rod 351 inserted through the horizontal through hole 341 on the mounting block 34 and the compression spring 344 and then threaded into the screw hole 361 to fasten the cradle 3 to the rotary member 36. When the mounting block 34 and the rotary member 36 are fastened together, the radial teeth 343 on the mounting block 34 are meshed with the radial teeth 365 on the rotary member 36, and the compression spring 344 is compressed between the mounting block 34 and the rotary member 36. By loosening the adjusting screw 35, the cradle 3 can be turned about the axis through the horizontal screw hole 361 to adjust the angle of inclination of the rod rest 2, and therefore the angle of inclination of the fishing rod 1 is adjusted. The rotary member 36 is fastened to a tripod 4 by a lock screw 46. The tripod 4 comprises a tripod socket 41 at the top, which receives the bottom rod 362 of the rotary member 36, an outward flange 47 around the tripod socket 41 at the top on which the outward flange 364 of the rotary member 36 rests, a horizontal screw hole 42 into which the lock screw 46 is threaded and stopped at the annular groove 363 on the bottom rod 362 of the rotary member 36 to lock it in position, and three tripod legs 43;44;45. By loosening the lock screw 46, the rotary member 36 can be turned in the tripod socket 41 to adjust the position of the cradle 3 horizontally, and therefore the direction of the fishing rod 1 and the rod rest 2 is changed. There is an anchoring fork 5 fastened to one tripod leg 45 by a lock screw 52. The anchoring fork 5 comprises a head 51 having a longitudinal through hole 55 and a side screw hole 511 in communication with the longitudinal through hole 55 at right angles, and two pointed prongs 53;54 bilaterally extended from the head 51 in the same direction. When the tripod leg 45 is inserted into the longitudinal through hole 55, the lock screw 52 is threaded into the side screw hole 511 and stopped against the tripod leg 45, and therefore the anchoring fork 5 is fastened to the tripod leg 45 firmly.

Figure 6:
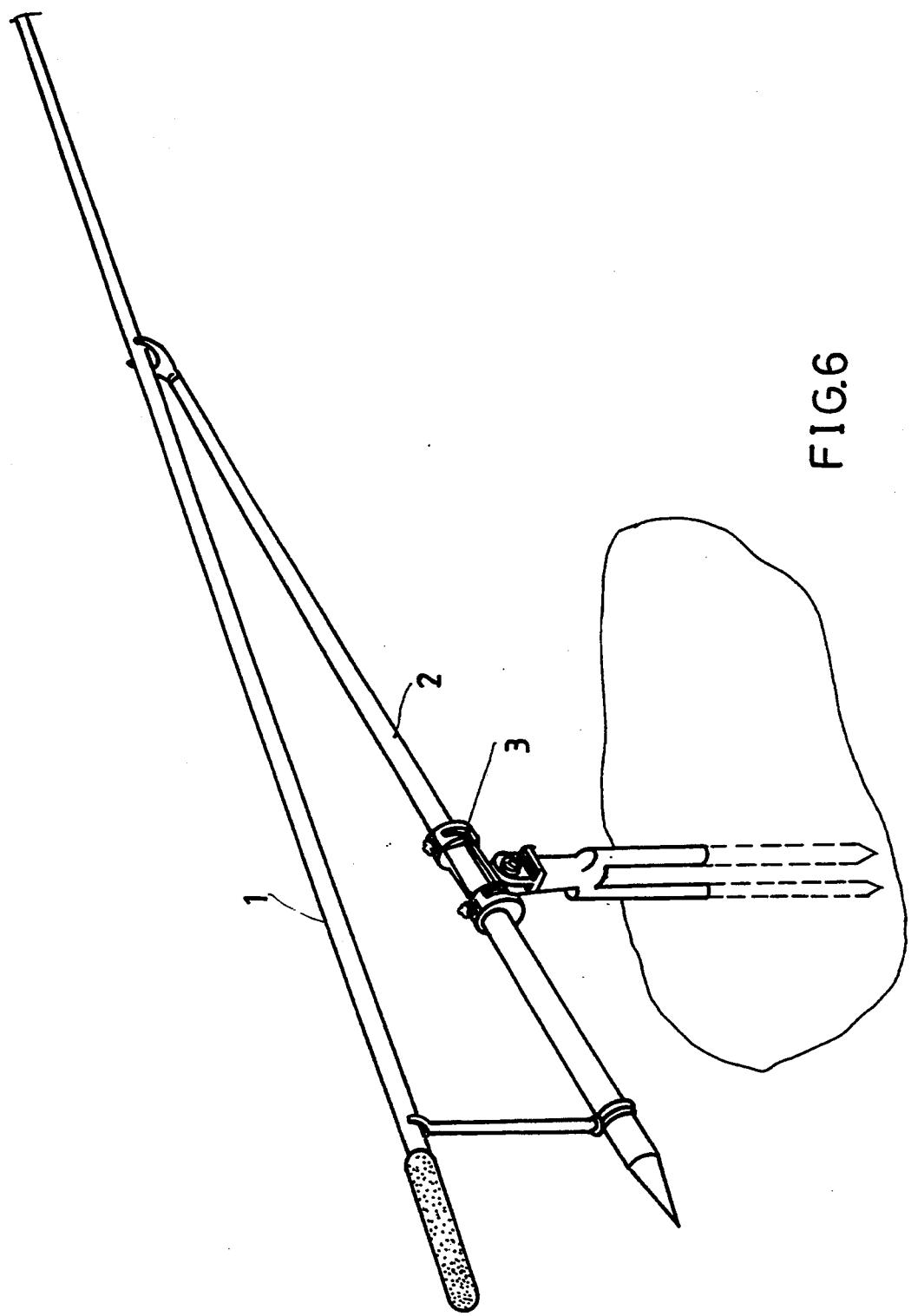
FIG. 6 shows the cradle and the rotary member directly fastened to the anchoring fork to hold a rod rest and a fishing rod.

Referring to FIG. 6, the rotary member 36 may be directly fastened to the head 51 of the anchoring fork 5 to rod rest the cradle 3 on the anchoring fork 5, by inserting the bottom rod 362 into the longitudinal through hole 55 and then tightening up the lock screw 52.

Figure 7:
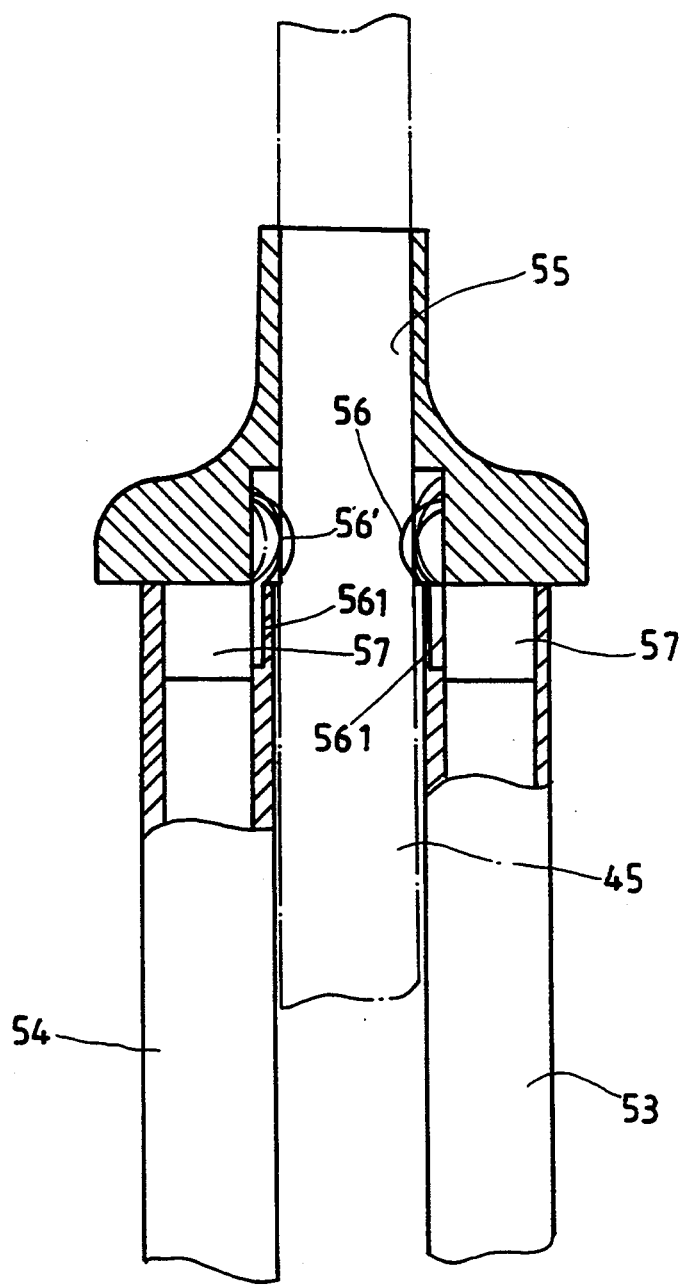
FIG. 7 is a longitudinal view in section of an alternate form of the anchoring fork according to the present invention.

Referring to FIG. 7, therein shown is an alternate form of the anchoring fork. According to this alternate form, the two pointed prongs 53;54 are separately made and then respectively fastened to two connecting rods 57 on the head 51, and two retaining springs 56;56' are fastened inside the longitudinal through holes 55 at two opposite sides. As the tripod leg 45 inserts into the longitudinal through hole 55, the retaining springs 56;56' are squeezed to deform, causing the tails 561;561' thereof to retain the tripod leg 45 in position. Therefore, this alternate form eliminates the arrangement of the side screw hole 511 and the lock screw 52.

Figure 8:
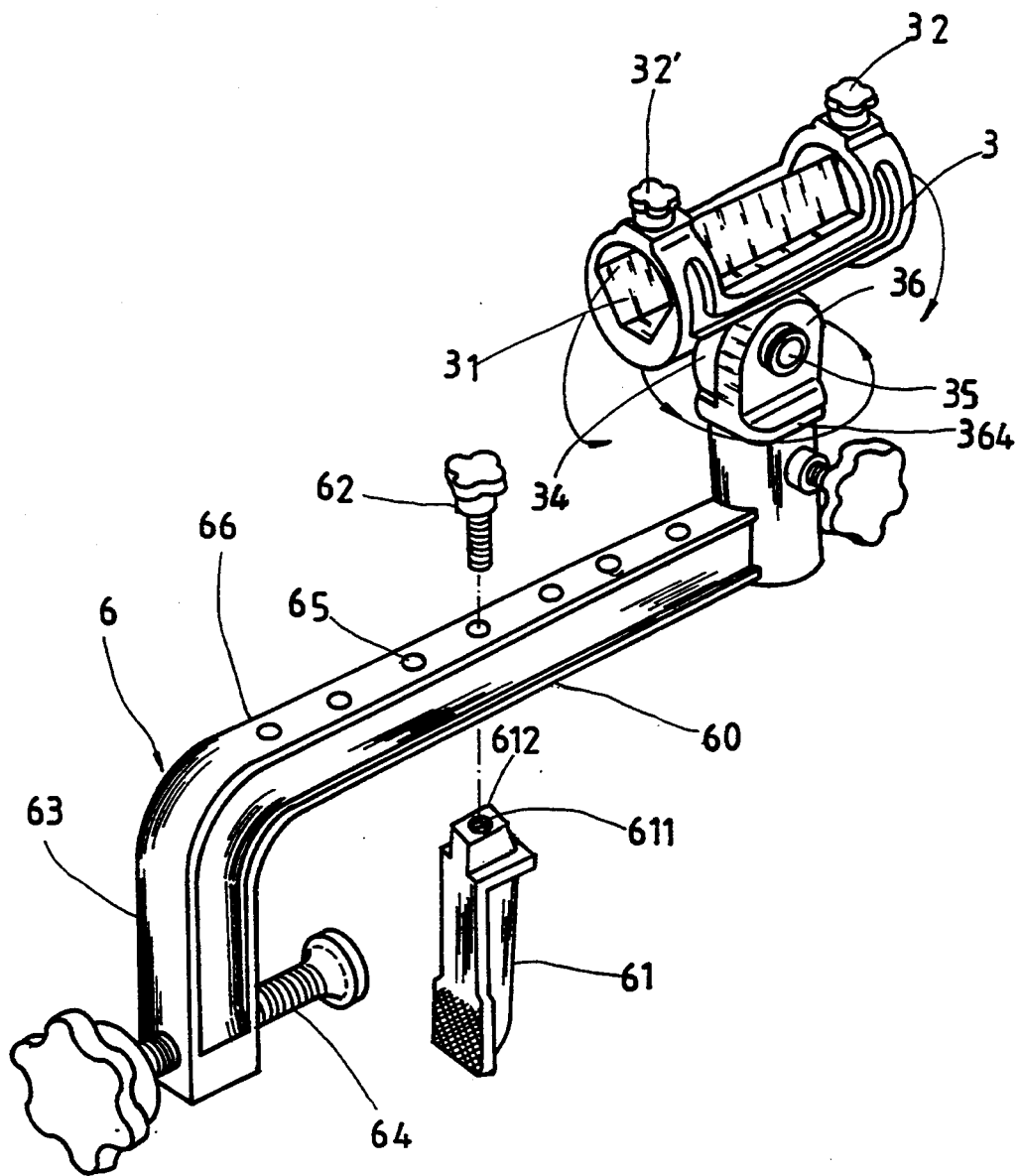
FIG. 8 shows a mounting assembly according to the present invention.

Referring to FIGS. 8 and 9, a mounting assembly 6 may be used and fastened to the side of a boat to hold the rotary member 36 and the cradle 3. The mounting assembly 6 comprises a substantially L-shaped mounting shaft 60 having a tension clamp 64 on the vertical shaft section thereof 63, a series of square holes 67 and a series of through holes 65 on the horizontal shaft section 66 thereof at two opposite sides. The through holes 64 and the square holes 67 are respectively aligned. There is provided a mounting-shaft plate 61 fastened to either square hole 67 by a fastening screw 62. The mounting-shaft plate 61 has a screw hole 611 on a top square block 612 thereof. By fitting the top square block 612 into either square hole 67 and then threading the fastening screw 62 through the corresponding through hole 65 on the horizontal shaft section 66 into the screw hole 611 on the top square block 612, the mounting-shaft plate 61 is fastened to the horizontal shaft section 66 of the mounting shaft 60. When the mounting shaft 60 is placed on the side 7 of a boat with the mounting-shaft plate 61 attached to the side 7 of the boat at one side, the tension clamp is turned from the opposite side, and therefore the mounting assembly 6 is fastened to the side 7 of the boat.

What is claimed is:

1. A pole rest supporting device comprising:
    locating means including a tripod having three tripod leg members, an anchoring fork fastened to one of said tripod leg members and a socket formed within a top section thereof;
    a rotary member mounted in said socket of said locating means, said rotary member comprising an outward flange in the middle supported above said socket of said locating means, a horizontal screw hole above said outward flange, a bottom rod of said rotary member inserted into said socket of said locating means;
    a lock screw threaded into a screw hole formed within said socket of said locating means to lock said bottom rod of said rotary member in said socket of said locating means; and,
    a cylindrical cradle fastened to said rotary member to hold a rod rest on which a fishing rod rests, said cradle comprising a longitudinal through hole, which receives said rod rest, two tightening up screws respectively threaded into two screw holes thereof to hold down said rod rest in the longitudinal through hole of said cradle, a mounting block at the bottom having a horizontal through hole fastened to the horizontal screw hole on said rotary member by a fastening screw;
    whereby said rotary member can be turned on said socket of said locating means horizontally when said lock screw of said locating means is loosened; said cradle can be turned on said rotary member vertically when said fastening screw is loosened.

2. The pole rest supporting device of claim 1 wherein said mounting block of said cradle comprises a circular recess, a compression spring received in said circular recess and stopped against said rotary member, a horizontal through hole through the center of said circular recess and connected to the screw hole on said rotary member by said fastening screw, radial teeth on one side thereof around said circular recess meshed with respective radial teeth on one side of said rotary member.

3. The pole rest supporting device of claim 1 wherein said locating means is an anchoring fork having a socket with a screw hole, to which said bottom rod of said rotary member is fastened by said lock screw, and two pointed prongs bilaterally extended from said socket in the same direction for fastening to the ground.

4. The pole rest supporting device of claim wherein said anchoring fork is releasably fastened to one tripod leg member by a threaded member.

5. The pole rest supporting device of claim 4 wherein said anchoring fork comprises a head having a longitudinal through hole, which receives one tripod leg of said tripod, two pointed prongs connected in parallel to said head, two retaining springs mounted inside the longitudinal through holes of said head at two opposite sides to hold down the tripod leg being inserted into the longitudinal through hole of said head.

6. The pole rest supporting device of claim 1 wherein said locating means is a mounting assembly for mounting said rotary member on the side of a board, said mounting assembly comprising a substantially L-shaped mounting shaft consisted of a vertical shaft section and a horizontal shaft section, and a mounting-shaft plate connected to said mounting shaft, said vertical shaft section having a tension clamp fastened thereto, said horizontal shaft section comprising a socket at a tail thereof, to which said rotary member is fastened, a series of square holes longitudinally spaced at one side, and a series of through holes longitudinally spaced at an opposite side and respectively linked to said square holes, said mounting-shaft plate having a square top block fitted into either square hole on said horizontal shaft section, said square top block of said mounting-shaft plate having a screw hole fastened to the corresponding through hole on said horizontal shaft section by a screw, said mounting assembly being fastened to the side of a boat by placing said mounting shaft on the side of the boat with said mounting-shaft plate attached to the side of the boat at one side and then turning said tension clamp toward an opposite side of the side of the boat.

* * * * *